United States Patent Office 2,892,243
Patented June 30, 1959

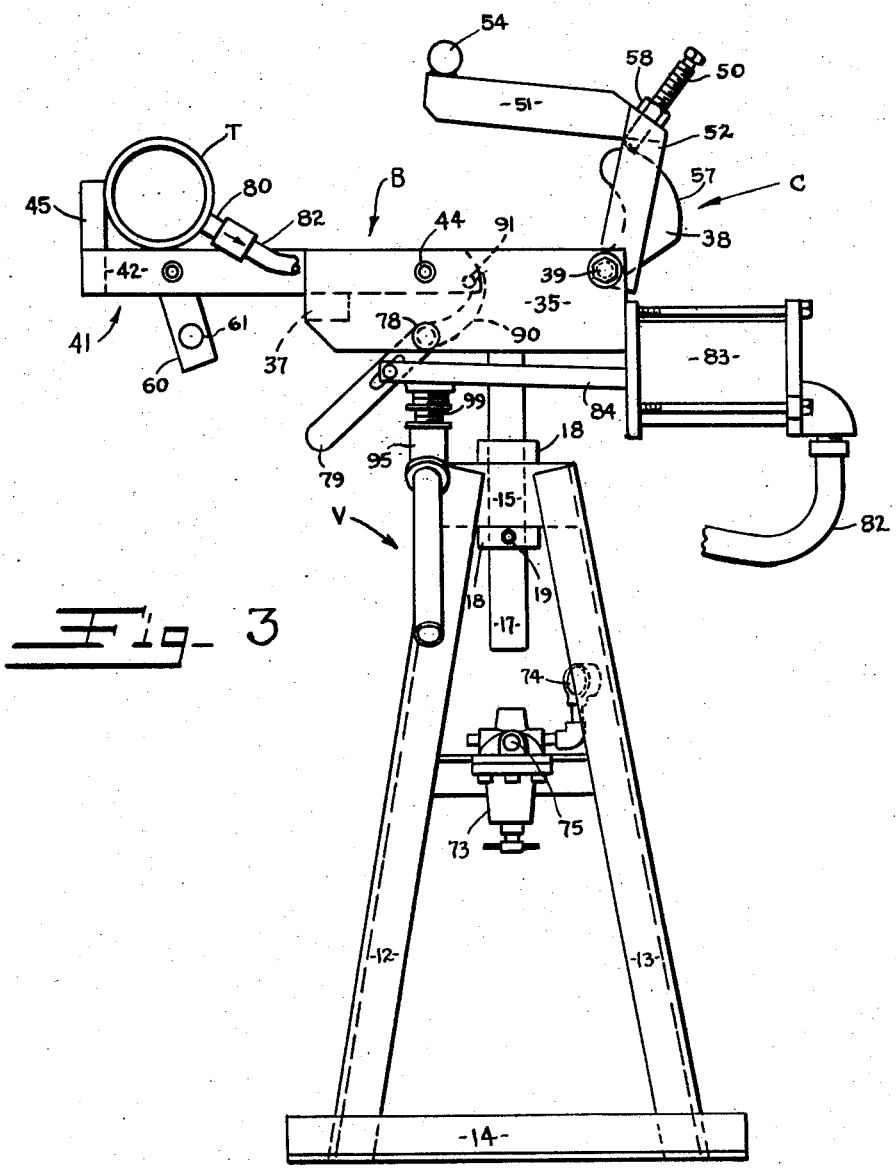

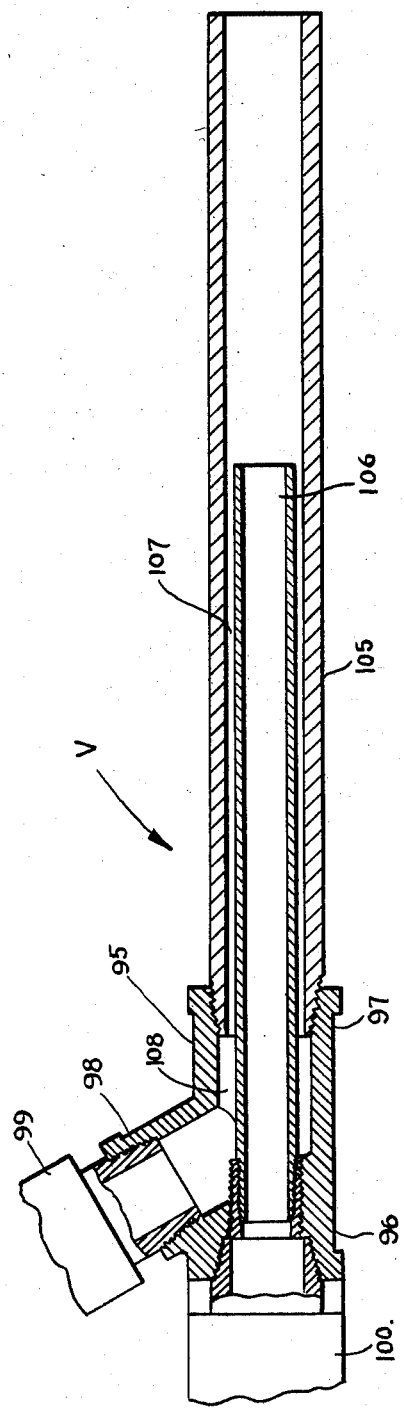

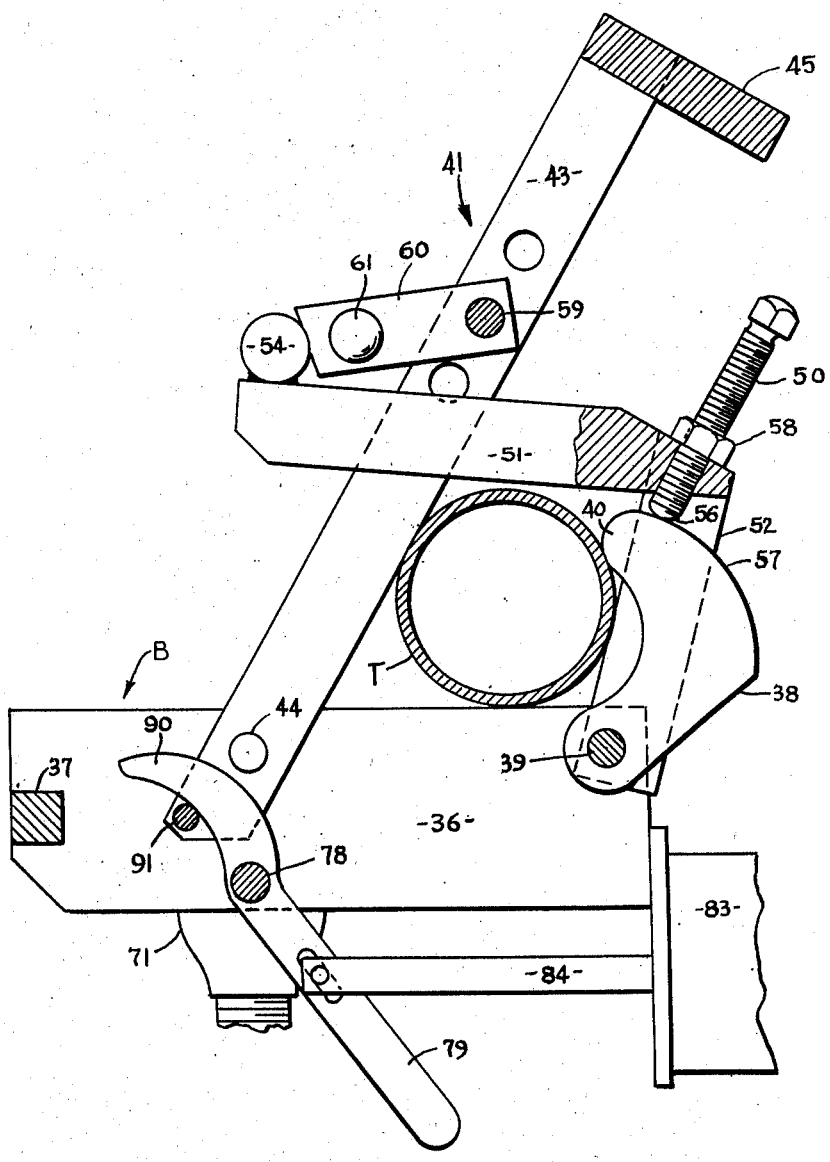

2,892,243

BAR FEED APPARATUS

Gerald B. Lanphere, Syracuse, and Harold D. Sperling, Skaneateles, N.Y., assignors to Lipe-Rollway Corporation, Syracuse, N.Y., a corporation of New York Application November 21, 1957, Serial No. 697,945

6 Claims. (Cl. 29—93)

This invention relates to bar feed apparatus to be used in connection with automatic bar working machines. The bar feed apparatus comprises a feed or guide tube in which the bar stock is placed, the tube having a cup-shaped stock bar pusher therein which is moved forwardly under fluid pressure to move the bar stock out of the feed or guide tube and into the bar working machine, after the guide tube has been positioned in axial alignment of the spindle of the bar working machine. Apparatus of this type is shown in the patent to E. F. Mariotte No. 2,300,457, issued November 3, 1942.

As described in that patent, the bar feed tube is moved out of axial alignment with the bar working machine in order to reload the feed tube with a new or fresh piece of bar stock. Upon insertion of the new bar in the tube, the stock pusher is moved to the rear of the tube by the new bar, whereby the new bar may be fed into the bar working machine by the stock pusher under the influence of the pressure from the fluid pressure source.

A problem hereto fore in connection with these machines has been that the bar feed guide tube was not adjustable. That is to say, only one size diameter tube could be used with the apparatus. This gave rise to the problem that when bar stock having a larger diameter than the bar feed tube was to be machined by the bar working apparatus, a separate and entirely different bar feed apparatus had to be used. Accordingly, it is an object of this invention to provide a bar feed apparatus having means which is adjustable to receive bar feed tubes of different diameters.

It is a further object of this invention to provide an interlock means between the adjustable bar feed tube clamp means and shut-off means in the bar feed machine, whereby a different size tube may be inserted in the machine and the bar stock may be loaded in the feed tube only when the machine is in an inoperative or "off" position.

In certain applications, it often occurs that the bar feed tube is of the same diameter as the spindle of the bar working machine. When this occurs, it is desirable that the stock pusher of the bar feed machine be of the type which can advance into the bar working machine spindle to move the bar stock completely into the bar working machine. A stock pusher of this type is more clearly disclosed in the patent to E. F. Mariotte No. 2,334,272, issued on November 16, 1943. A difficulty arises in such an application, however, in that it is often difficult if not impossible to return the stock bar pusher to the guide tube of the bar feeding machine.

Accordingly, it is a further object of this invention to provide means for automatically returning the stock bar pusher of a bar feed machine to the rear of the bar feed guide tube.

More specifically, it is a further object of this invention to provide automatic means for returning a stock bar pusher into the guide tube of the bar feeding apparatus when a portion of the stock bar pusher has advanced out of the tube of the bar feeding machine and into the spindle of the bar working machine.

In the drawings—

Figure 3 is a view, similar to Figure 2, showing the bar feed tube clamp means in open position and the guide tube moved to reloading position.

Figure 4 is a fragmentary cross-sectional view of a portion of the invention, and Figure 5 is a sectional view taken in the direction of line 5—5 on Figure 1.

Figure 1:
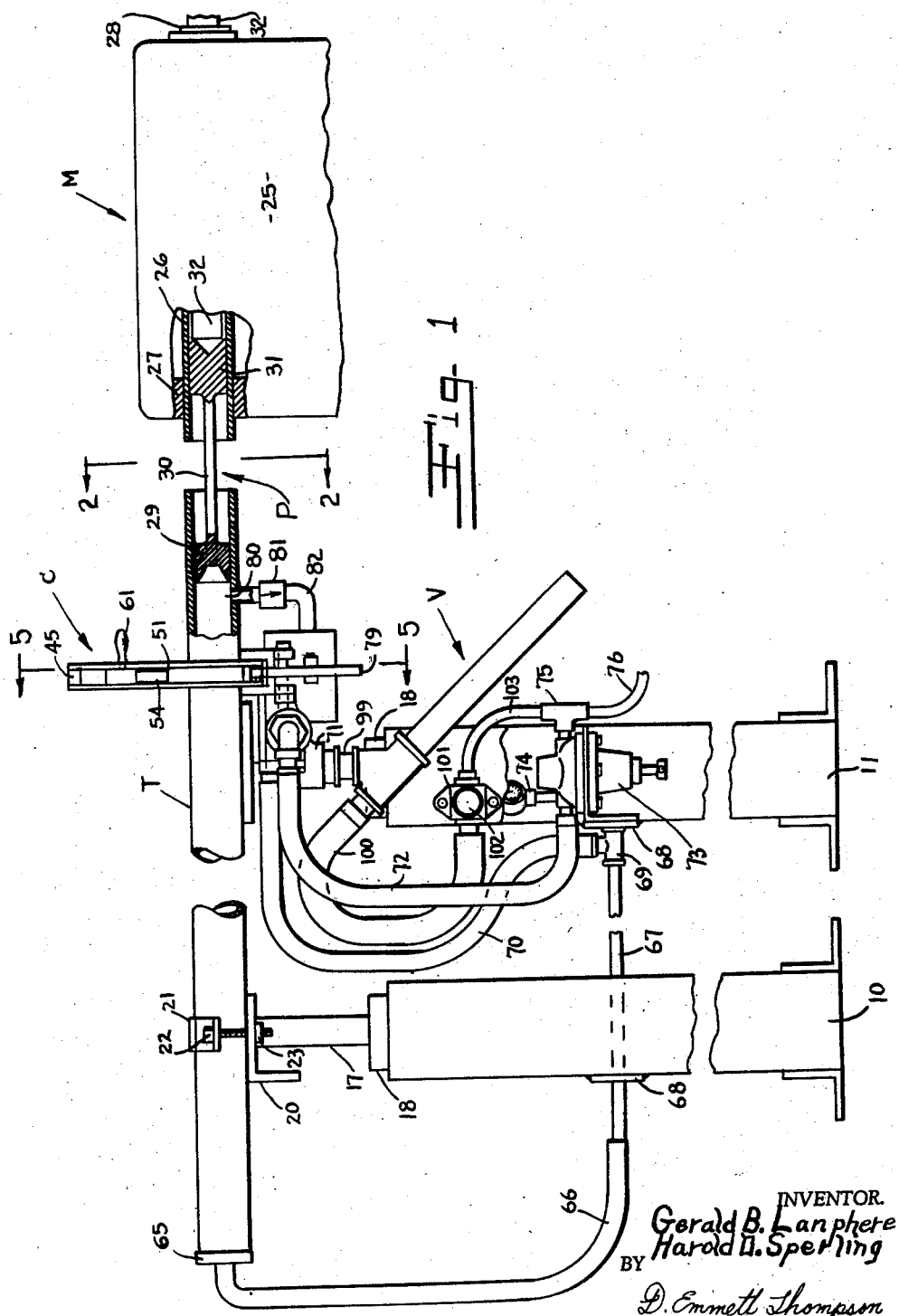
Figure 1 is a side elevational view of the invention with parts broken away and parts in section for purposes of clarity.
Figure 2:
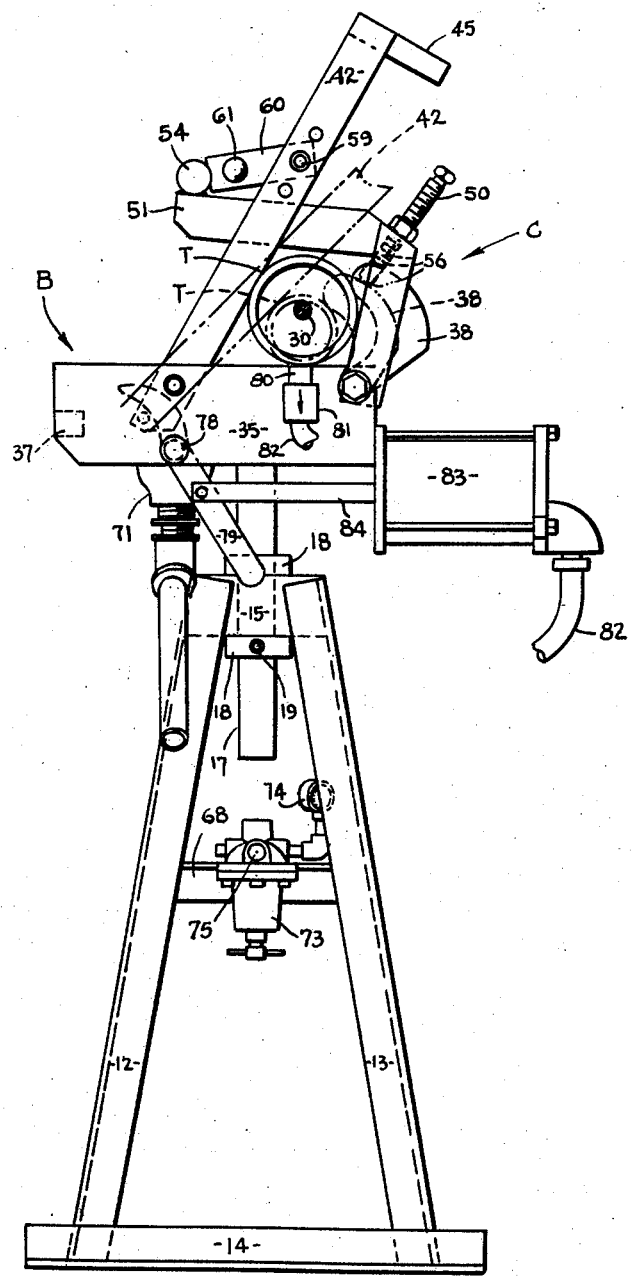
Figure 2 is a front end elevational view of the invention showing the bar feed guide tube clamp means in a closed position.

Referring now to Figure 1, the bar feed apparatus is made up of a pair of standards 10 and 11 on which the bar feed guide tube T is supported. Each of the front and rear standards 10 and 11 is made up of a pair of channel irons 12 and 13 which are fixed together in angular relationship, as best seen in Figures 2 and 3, by means of a pair of angle foot irons 14 welded or fixed by other suitable means to the bottom of the irons 12 and 13 and a block 15 fixed by welding, or other suitable means, between the upper ends of the irons 12 and 13. Mounted in each of the blocks 15, in the front and rear standards 10 and 11, is a shaft 17. The shafts 17 are maintained in vertically adjusted position in alignment with the spindle 26 of the bar working machine by means of a pair of collars 18 which are fixed to the shafts 17 by means of a set screw 19, or the like. Fixed to the upper end of the shaft 17 of the rear standard 10 is a supporting plate 20 and on which the rear portion of the tube T is clamped by a semi-circular clamping arm 21 having a pair of fasteners 22 extending therethrough and affixed to the plate 20.

The forward end of the tube T is supported on the base, generally indicated B, of the adjustable clamp means generally indicated at C. Suitably fixed to the upper end of the shaft 17 on the forward standard 11 is the base B. The rear shaft 17 is pivotally mounted in the block 15 so as to permit the front end of the tube T to be swung out of axial alignment with the bar working machine generally indicated M.

We have shown, in Figure 1, a bar working machine M comprising a head 25 having a spindle 26 supported in a bearing 27, and a collet 28 through which the forward portion of the stock bar 32 extends for machining. A stock pusher is mounted for slidable movement in the feed or guide tube T, and includes a piston 29 and a connecting rod 30 to which the cup-shaped stock pusher 31 is affixed in order to push the bar stock 32 forwardly through the guide tube T and into the spindle 26 of the bar working machine M. A stock pusher of this type is more clearly shown and disclosed in the Patent No. 2,334,272 above referred to.

Referring now to Figures 2, 3 and 5, wherein the adjustable clamp means for receiving bar feed tubes T of different diameters is more clearly shown, it will be seen that the base is made up of a pair of plates 35 and 36 having a stop member 37 affixed between the plates at the outer or front ends thereof. The upper surface of the plates 35 and 36 provide the support for the tube T, as shown in Figures 2, 3 and 5.

A combination clamping and stop finger 38 is pivotally mounted between the inner ends of the plates 35, 36, on a pivot 39. The finger 38 curves upwardly and forwardly with the free end 40 of the finger engaging the guide tube T at a point above the plane of the axis of the tube and serves, in conjunction with a clamping arm formed of a pair of plates 42, 43, a means for clamping the tube in fixed position on the plates 35, 36. The plates 42, 43, are pivotally mounted between the plates 35, 36, on pins 44 carried by the plates 35, 36, located inwardly from the stop 37. A stop member 45 is secured to the outer free ends of the clamping arm plates 42, 43, this stop being engaged by the guide tube T when the arm is moved into horizontal position against the stop 38, as shown in Figure 3, to provide a forward extension of the plates 35, 36, for supporting the guide tube T when it is swung out of axial alignment with the machine spindle 26 for reloading. The tube is reloaded by inserting a stock bar in the forward end thereof and moving it axially through the tube. After the tube T has been reloaded with a fresh bar, the clamping arm plates 42, 43 is moved upwardly about pivot 44, thereby moving the tube T inwardly in engagment with the clamping finger 38.

The clamping finger 38 is fixed in an adjusted position by means of the adjusting bolt 50 which is carried by an arm 51. The arm 51 is fixedly secured, relative to the base plates 35, 36, by a pair of plates 52 fixed to the plates on opposite sides of the finger 38 and extending upwardly from the plates. The arm 51 extends forwardly over the guide tube T and is provided at its outer end with a projection 54. As best seen in Figure 5, the adjusting screw 50 is threaded through the rear portion of the arm 51, and the inner end 56 of the screw engages the arcuate surface 57 of the finger 38 to limit rearward movement of the finger 38 when the guide tube T is moved against the end 40 of the finger. The screw 50 is locked in adjusted position by a jam nut 58. With this arrangement, the finger 38 may be adjusted to a forward position to effectively result in the clamping of a guide tube of smaller diameter.

Mounted between the plates 42 and 43 of the clamping arm in a pivotal fashion at 59 is a latch 60 having a handle 61. The latch 60 cooperates with the projection 54 mounted on the outer end of the arm 53 to fix the clamping arm in an upper or clamping position with respect to the tube T, whereby the clamping arm and the clamping finger 38 cooperate to clamp the tube T against the base B so as to prevent any lateral movement of the tube T while the machine is in operation.

Referring to Figure 2, wherein a smaller tube T has been shown in dotted lines, it will be seen that the clamping finger 38 can be moved to the position indicated by the dotted lines and fixed in that adjusted position by means of the adjusting bolt 50, as previously described, all whereby the clamping arm and the finger 38 cooperate to hold the tube T against the base B, regardless of the diameter of the tube T, in order that bar feed guide tubes T of different and varying diameters may be mounted in the apparatus.

When the tube T has been clamped in a fixed position by the adjustable clamp structure C and the stock pusher P is in the rear of the tube T and the new bar 32 has been loaded in the tube T, the bar 32 is caused to be moved forwardly in the tube T into the spindle 26 of the bar working machine by the stock pusher P under the influence of fluid pressure in the following manner. A suitable source of fluid pressure, such as compressed air or the like, is supplied to the rear of the tube T and enters the rear of the tube T through a closure cap 65, flexible conduit 66, pipe 67, which is suitably supported by means of plates 68 on the front and rear standards 10 and 11, T fitting 69, flexible tube 70, valve 71, flexible tube 72, pressure regulator 73 having indicator 74, T fitting 75 and a tube 76 which is connected to the source of fluid pressure (not shown). The valve 71 is affixed to the plate 36 of the base B by suitable means (not shown), and has an operating shaft 78 extending through the plates 35 and 36. An operating handle 79 is affixed to the shaft 78 and is mounted between the plates 35 and 36, whereby when the handle 79 is moved to the position, as seen in Figure 5, the valve 71 is open to permit the flow of the fluid pressure from the source 76, into the rear end of the tube T to move the pusher P and the stock bar B forwardly.

When the stock bar pusher P reaches the position shown in Figure 1, the vent or port 80 in the tube T is uncovered so the pressure flows into the check valve 81, line 82 and the cylinder 83 affixed by suitable means to the ends of the plates 35 and 36. A rod 84 is affixed to the piston of the cylinder 83, and the rod 84 is pivotally connected to the handle 79 by means of the pin and slot arrangement intermediate the outer end of the handle 79 and the shaft 78.

As will be obvious, when the port 80 is uncovered so as to allow the fluid pressure to enter the rear end of the cylinder 83, the handle 79 is moved in a clockwise direction, thereby shutting off the valve 71, consequently shutting off the pressure to the rear of the tube T. This provides an automatic shut-off feature for the apparatus which is very important since it stops the movement of the stock bar pusher T when it reaches the forward end of its travel.

As best seen in Figure 5, the inner end of the handle 79 is provided with a curved or arcuate portion 90 which fits between the plates 42 and 43 of the clamping arm for interlocking engagement with a pin 91 extending between the inner ends of the plates 42, 43. As will be apparent, the movement of the clamp arm from the upward or clamping position shown in Figures 2 and 5, to the open or downward position shown in Figure 3, causes the valve 71 to be shut off by reason of the interlock between the arcuate portion 90 of the handle 79 and the pin 91. This insures that no feed pressure can be applied to the rear end of the guide tube when the tube clamp C is opened up. This interlock between the arm 79 and arm 41 is an important feature for obvious reasons.

An arrangement is provided to create a vacuum in the tube T behind the piston 29 of the stock pusher P in the rear of the tube T, in order to move the stock pusher P rearwardly out of the spindle 26 of the bar working machine and into the tube T from whence it may be moved to the rear of the tube T by the insertion of a new bar 32.

The vacuum is created by an evacuator V, shown more clearly in Figure 4, consisting of the Y fitting 95 having aligned hubs 96, 97, and a branch hub 98. The branch hub 98 is connected, by means of the line 99, to the exhaust side of the three-way operating valve 71. The hub 96 is connected by means of the line 100 to the manually operated valve 101 having a handle 102, line 103 and T fitting 75 to the line 76 which, in turn, is connected to the fluid pressure source. The hub 96 of the fitting 95 of the evacuator V has a pipe 105. Mounted in the reduced inner end of the hub 96 is a pipe 106 which extends in a concentric relation through a portion of the pipe 105. Since the diameter of the pipe 106 is smaller than the diameter of the pipe 105, an annular space 107 is provided between the two pipes, which annular space communicates with the line 99 to the exhaust port of the valve 71.

In operation, when the stock pusher P is in the position shown in Figure 1, past the port 80, the cylinder 83 has turned the valve to the off position, as was previously described. In this off position, the valve connects the exhaust 99 through the valve 71, pipe 70, fitting 69, pipe 67 and line 66, to the rear of the tube T. When it is desired to move the pusher P rearwardly out of the spindle 26 of the bar working machine M and into the tube T, it is merely necessary to operate the handle 102 of the valve 101. This allows pressure to enter the valve 101 from the line 76, fitting 75 and line 103. The pressure is connected to the rear of the fitting 95 through the entrance 96 and line 100. The pressure rushing through the inner pipe 106 and entering the outer pipe 105 causes a pressure drop in the annular space 107 and hence, line 99, valve 71, line 70, pipe 67 and line 66, to the rear of tube T. This pressure drop continues, creating a vacuum in the tube T behind the piston 29 of the pusher P, thus causing the pusher P to move rearwardly into the tube T. When the pusher P has moved sufficiently rearwardly in the tube T to take the cup-shaped pusher 31 out of the spindle 26 of the bar working machine M, the valve handle 102 may be returned to the closed position, and the pusher P may then be returned to the rear of the tube T by the insertion of a new piece of stock bar 32 in the tube T. Or, if desired, the vacuum may be maintained until the pusher is moved to the rear end of the tube.

In operation, the pressure required to move the stock pusher P and the bar 32 forwardly in the tube T is of the order of five pounds per square inch, and this pressure is normally provided to the rear of the tube T through the valve 71 by means of the pressure regulator 73 having the indicator 74. The amount of pressure necessary to create the vacuum in the rear of the tube T, as previously described, is of the order of ninety pounds per square inch, and enters the evacuator V through line 76, fitting 75, line 103, valve 101 and line 100, in the manner described. Consequently, the fluid pressure source should be of the order of ninety pounds per square inch in order to properly operate the machine.

As will be apparent, the check valve 81 which is connected between the vent 80 and line 82 to the cylinder 73 is of the one-way type, as indicated by the arrow on the valve 81 in the drawings. This insures that when the back of the tube between the piston 29 and the rear of the tube is evacuated by means of the evacuator V to return the pusher P, as previously described, and the port 80 is uncovered, the valve 81 will close, thereby precluding any possibility that the vacuum could operate through line 82 to move the piston in the cylinder 83 to the right to turn the valve 71 on.

What we claim is:

1. A bar feed apparatus for feeding stock bars to an automatic bar working machine having a hollow stock bar receiving spindle, said bar feed apparatus comprising a bar feed guide tube having its forward end in juxtaposition to the machine spindle, a stock pusher slidably mounted in said guide tube to feed a stock bar into the bar working machine spindle, rear and forward supports for the rear and forward ends respectively of said guide tube, said guide tube being movable on said rear support about a vertical axis to effect movement of the forward end of said guide tube into and out of registration with the machine spindle, said forward support including a base portion, a stop finger mounted on said base for engagement by one side of said guide tube when the forward end thereof is positioned in axial registration with the machine spindle, a clamping arm pivotally mounted on said base, said arm being movable upwardly about its pivot to engage the opposite side of said guide tube and clamp the same against said stop finger, means for releasably locking said arm in clamping position, said means being adjustable to cooperate with means for adjusting said finger to receive and center bar feed guide tubes of varying sizes on said base portion with respect to the machine spindle.

2. A bar feed apparatus for feeding stock bars to an automatic bar working machine having a hollow stock bar receiving spindle, said bar feed apparatus comprising a bar feed guide tube having its forward end in juxtaposition to the machine spindle, a stock pusher slidably mounted in said guide tube to feed a stock bar into the bar working machine spindle, rear and forward supports for the rear and forward ends respectively of said guide tube, said guide tube being movable on said rear support about a vertical axis to effect movement of the forward end of said guide tube into and out of registration with the machine spindle, said forward support including a base portion, a stop finger mounted on said base for engagement by one side of said guide tube when the forward end thereof is positioned in axial registration with the machine spindle, a clamping arm pivotally mounted on said base, said arm being movable upwardly about its pivot to engage the opposite side of said guide tube and clamp the same against said stop finger, means for releasably locking said arm in clamping position and said arm being movable downwardly about its pivot to a horizontal position to form an extension of said base to support said guide tube in movement laterally from said finger.

3. A stock bar feeding apparatus for use in connection with an automatic bar working machine having a hollow bar receiving spindle, said bar feed apparatus comprising an elongated bar feed guide tube having its forward end in juxtaposition to the machine spindle, a stock bar pusher slidably mounted in said guide tube for advancing a stock bar through said tube into the machine spindle, a support for supporting the rear end of said guide tube, a forward support for supporting the forward end of said guide tube, said guide tube being movable on said rear support about a vertical axis for movement of the forward end of said tube into and out of axial registration with the machine spindle, said forward support including a base section extending transversely of said guide tube, a stop member mounted on said base for engagement by one side of said guide tube above the axis thereof, said stop member being adjustable transversely of the axis of said tube, a clamping arm pivotally mounted to said base section on a horizontal pivot and being movable upwardly about its pivot to engage the opposite side of said guide tube above the axis thereof and clamp the tube against said stop member, means for releasably locking said arm in clamping position, said arm being movable downwardly about its pivot to horizontal position to form an extension of said base section for supporting said guide tube in movement thereof laterally from said stop member.

4. Bar feed apparatus for use in connection with a bar working machine having a hollow spindle, said bar feed apparatus including a guide tube mounted for movement into and out of axial alignment with said spindle, a stock pusher including a piston slidably mounted in said tube, said tube being open at the end confronting said spindle and being connected by valve means to a source of fluid pressure at its opposite end, adjustable clamp means for clamping said tube in said apparatus including a base, an adjustable clamping finger mounted at one end of said base, a clamping arm movable between an open position where it forms an extension of said base and a closed position where it cooperates with said finger to clamp said tube on said base, said valve being operable to connect the end of said tube to an evacuator comprising a Y-shaped fitting having a first leg connected to the rear of the tube, a second leg connected to a source of fluid pressure, and a pair of concentric inner and outer tubes extending outwardly from the third leg of the fitting, with the outer tube extending beyond the inner tube whereby when second leg is connected to a fluid pressure source said inner and outer legs will form a vacuum which may be connected to the rear of said tube behind said pusher through said first leg to move said pusher rearwardly in said tube.

5. The invention of claim 4, wherein interlock means are provided between said valve and said movable arm, whereby said valve is inoperable when said arm is in the open position.

6. Bar feed apparatus for use in connection with bar working apparatus, said bar feed apparatus comprising a bar feed guide tube having its forward end in alignment with the spindle of the bar working apparatus, rear and forward supports for the rear and forward ends of said guide tube, said guide tube being movable on said rear support about a vertical axis to effect movement of the forward end of said guide tube into and out of registration with the machine spindle, said forward support including a base portion, valve means carried by said base portion having an operating handle movable between off and on positions to connect a source of fluid pressure through said valve means to the rear of said guide tube, a stop finger mounted at one side of said base portion and cooperable with a clamping arm mounted in pivotal fashion at the other end of said base to releasably clamp forward end of said guide tube on said base, said clamping arm being movable between clamping and unclamping positions and forming an extension of said base to support said tube in the unclamped position, interlock means between said clamping arm and said valve handle whereby said valve handle is moved to the off position when said clamping arm is moved into unclamping position to disconnect the source of fluid pressure from the end of said guide tube, said interlock means rendering said valve handle inoperative when said clamping arm is in the unclamped position.

References Cited in the file of this patent

UNITED STATES PATENTS

| | | |
|---|---|---|
| 2,300,457 | Mariotte | Nov. 3, 1942 |
| 2,327,916 | Mariotte | Aug. 24, 1945 |
| 2,451,360 | Twamley | Oct. 12, 1948 |

FOREIGN PATENTS

| | | |
|---|---|---|
| 385,552 | Great Britain | July 16, 1932 |